United States Patent [19]
Reichert

[11] 3,760,930
[45] Sept. 25, 1973

[54] METHOD AND APPARATUS FOR INJECTING BY POSITIVE ACTION COLLAPSIBLE CARTON TUBES INTO HOLDERS OF A TUBE FILLING MACHINE

[76] Inventor: August Reichert, 29 Berwyn Pl., Glen Rock, N.J. 07452

[22] Filed: Dec. 22, 1971

[21] Appl. No.: 210,748

[52] U.S. Cl............... 198/25, 198/33 AD, 198/179, 214/8.5 C
[51] Int. Cl............................................. B65g 47/06
[58] Field of Search..................... 193/27, 32, 25 FT; 198/20 R, 25, 33 AD, 54, 56, 179, 210; 214/1 BA, 1 BD, 1 BV, 8.5 C; 221/176, 179-181, 219

[56] References Cited
UNITED STATES PATENTS

| | | | |
|---|---|---|---|
| 3,093,234 | 6/1963 | Janssen Jr.......................... | 198/25 X |
| 1,290,888 | 1/1919 | Bracy............................... | 198/179 X |
| 1,981,272 | 11/1934 | Kuhn et al. ....................... | 193/27 X |
| 1,600,188 | 9/1926 | McNeely.............................. | 193/27 |
| 2,335,239 | 11/1943 | Gladfelter et al..................... | 198/25 |
| 3,124,065 | 3/1964 | Bozek et al...................... | 198/210 X |
| 3,386,558 | 6/1968 | Benatar........................ | 214/1 BV X |
| 3,590,982 | 7/1971 | Banyas .......................... | 214/1 BA X |
| 1,056,291 | 3/1913 | Nazel.............................. | 198/179 X |

*Primary Examiner*—Evon C. Blunk
*Assistant Examiner*—W. Scott Carson
*Attorney*—Thomas E. Tate

[57] ABSTRACT

A method and apparatus for injecting by positive action empty collapsible carton tubes of a substantially uniform diameter into tube holders of a machine for filling the tubes with a suitable material, in which there is provided a supply hopper for the tubes including an outlet channel having a series of angularly projecting flange portions arranged in spaced relation along one inner side surface of the channel and another series of other angularly projecting flange portions arranged in spaced relation along the opposite inner side surface of the channel, each of the flange portions projecting from the one inner side surface of the channel being positioned in an intermediate and staggered spaced relation to flange portions projecting from the opposite inner side surface of the channel so as to provide a series of relatively short angular paths for permitting a controlled restricted passage of each tube one at a time between flange portions at opposite inner sides of the channel with a weighted end portion of the tube under the force of gravity initially passing through a restricted angular path defined by a first pair of flange portions projecting from the opposite inner side surfaces of the channel and thereafter being held back by a next succeeding flange portion until the opposite end portion of the tube or relatively lighter weight moves along the restricted angular path to a point where the entire tube passes through the gap defined by the preceding pair of said projecting flange portions.

Thus each tube passes in turn in such restricted manner through the series of short angular paths defined by the series of angular flange portions projecting from opposite inner side surfaces of the channel and ultimately is disposed on a receiving platform in a substantially horizontal relation and not in a random tilted or jamming position.

Thereafter a tube carrier injection mechanism including suitable cam-operated jaws or spring fingers carried by devices operably connected to arms of a rotatable spider are arranged to periodically and successively grasp the carton tube disposed on the receiving platform to angularly position the grasped tube and inject the tube in a positive action into a selected tube holder of the tube filling machine. Upon the tube being injected into the tube holder the cam-operated jaws or spring fingers grasping the tube are thereafter actuated to an open position so as to release the injected tube then effectively inserted in the tube holder.

9 Claims, 11 Drawing Figures

United States Patent [19]
Reichert
[11] 3,760,930
[45] Sept. 25, 1973
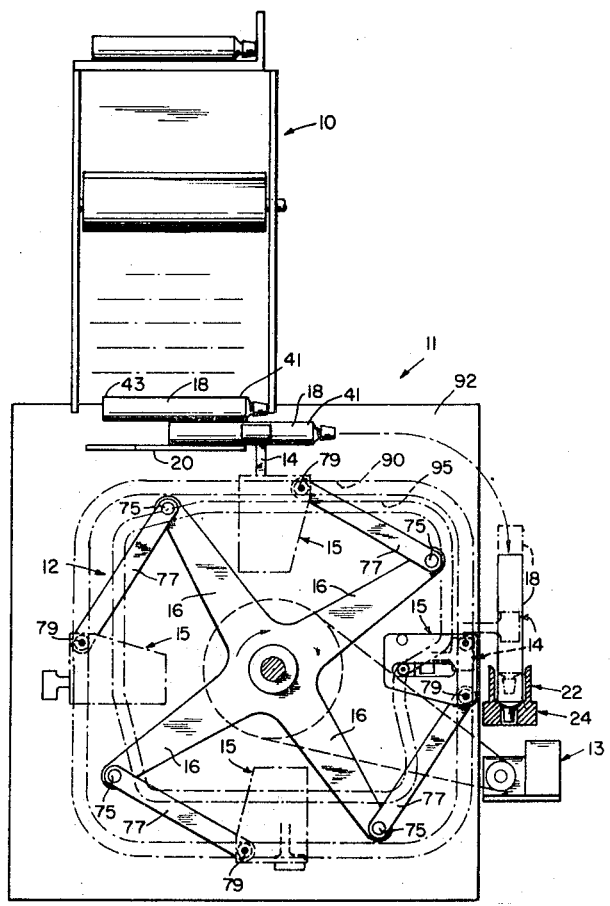

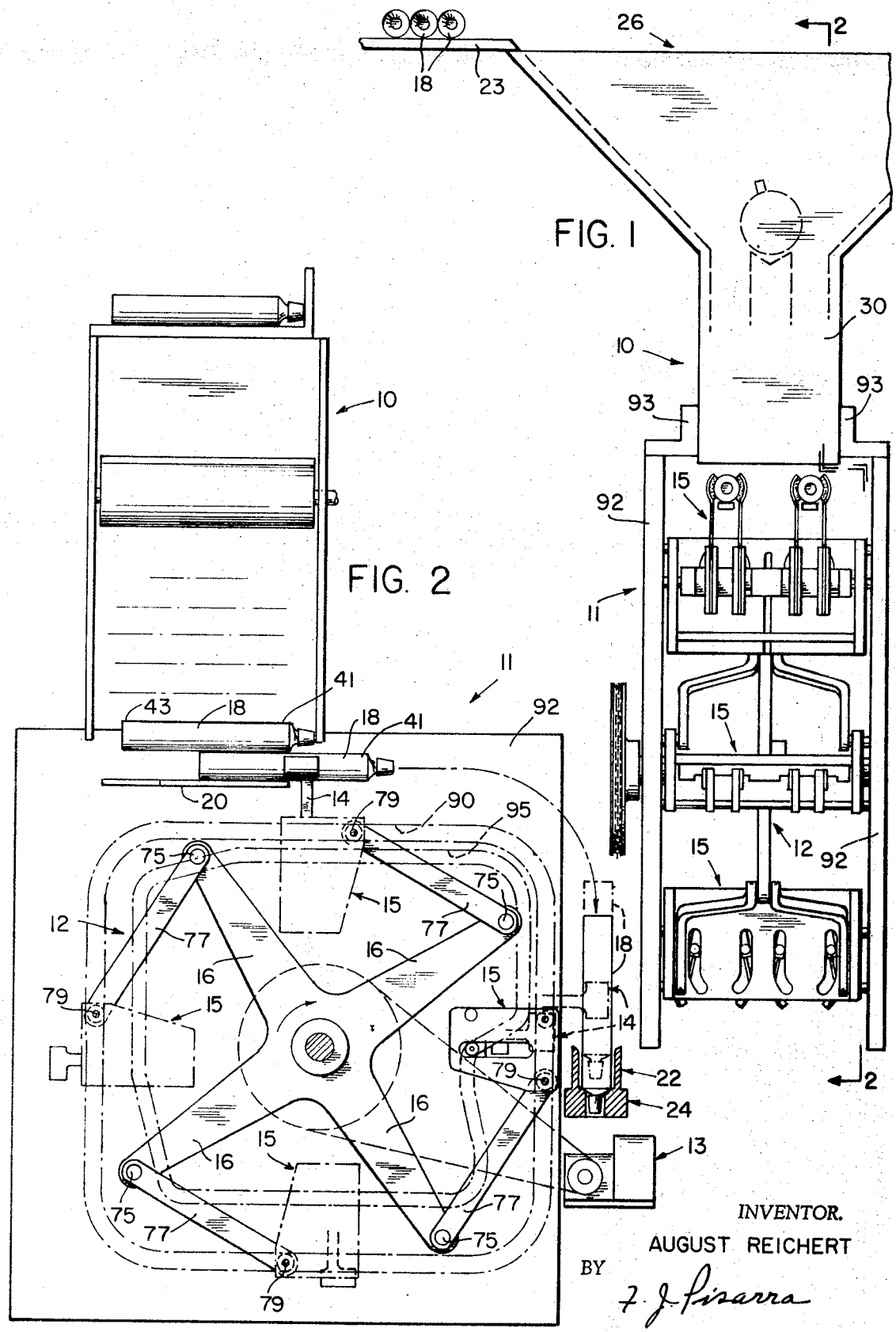

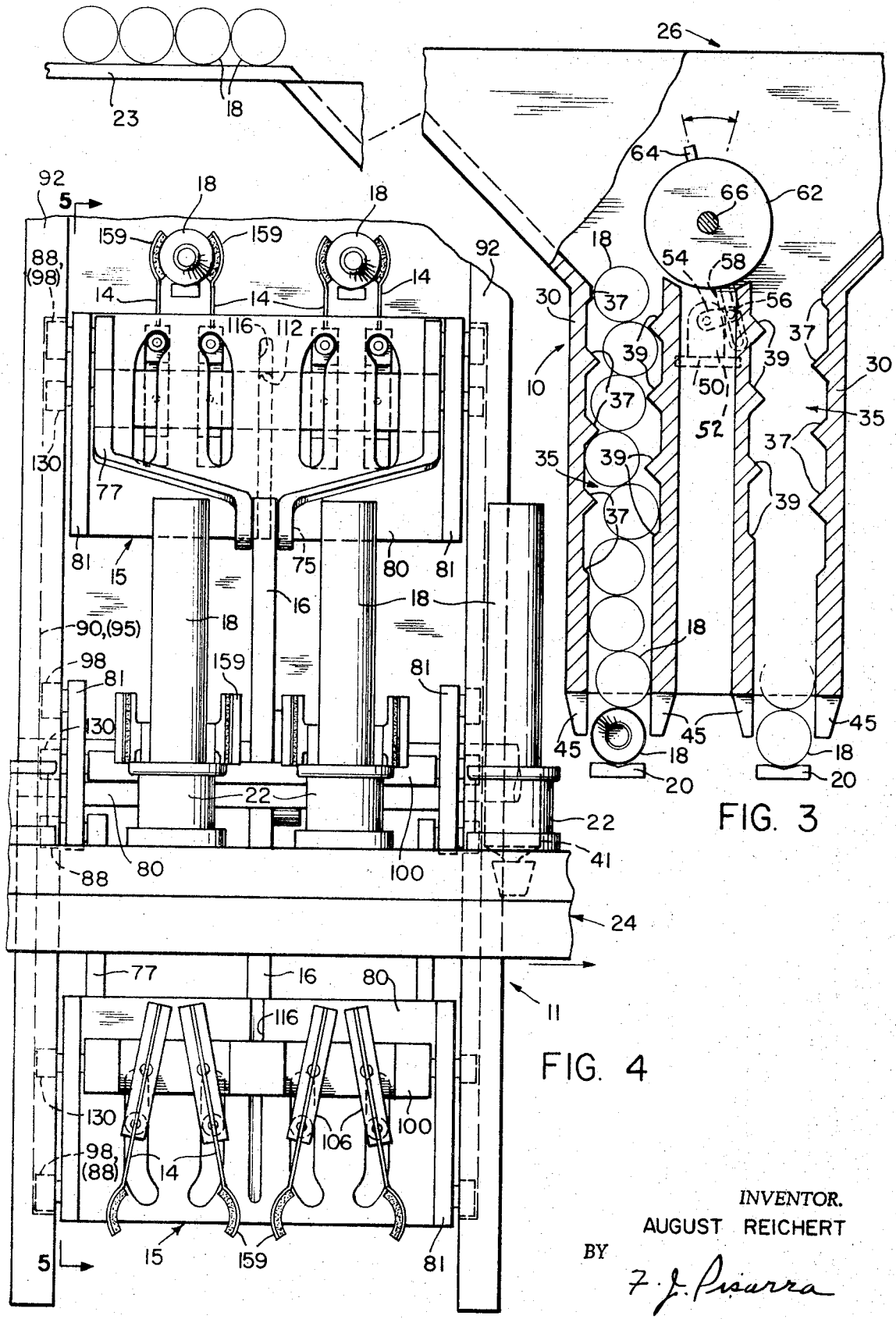

INVENTOR.
AUGUST REICHERT
BY
F. J. Pisarra
Attorney

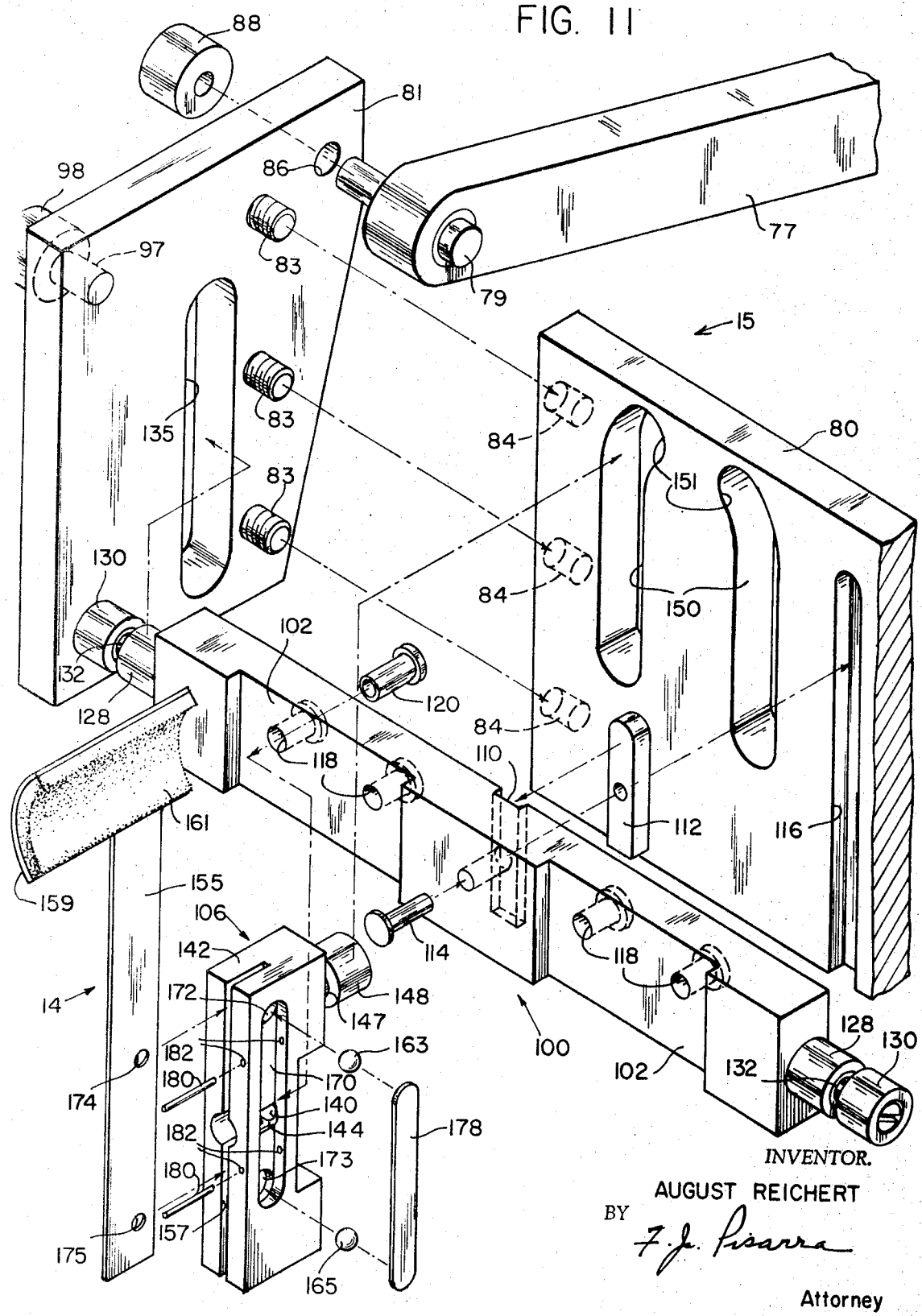

METHOD AND APPARATUS FOR INJECTING BY POSITIVE ACTION COLLAPSIBLE CARTON TUBES INTO HOLDERS OF A TUBE FILLING MACHINE

CROSS REFERENCE TO RELATED APPLICATIONS AND PATENTS

The present invention relates to a method and apparatus for injecting by positive action collapsible carton tubes into tube holders of a tube filling line and to an improved hopper or chute for directing the tubes to a tube carrier injection mechanism.

The hopper or chute may be supplied with empty collapsible carton tubes by a method and apparatus for extracting the tubes from a transport receptacle and feeding the extracted tubes to the hopper, as disclosed in my copending United States application for patent, Ser. No. 178,558 filed Sept. 8, 1971.

Furthermore, the tube holders provided in the aforesaid tube filling line may be of the type disclosed in my U.S. Pats. No. 2,574,157 and No. 3,147,018.

BACKGROUND OF THE INVENTION

1. Field of the Invention

The invention is in the field of high speed tube filling apparatus and methods and is specifically directed to an improved method and apparatus for injecting empty collapsible carton tubes into tube holders of a machine for filling the tubes with dispensible materials of a wide range of viscosities, such as tooth paste, shaving cream, paints and food pastes, as well as other materials of suitable types well known in the art.

2. Description of the Prior Art

Heretofore there have been provided tube filling apparatus, such as illustrated by the automatic tube filling line GA-2 shown in a bulletin identified as GAD2-1069-E of Arenco***Arenco AB Machinery Division of the Swedish Match Group and bearing a notation "Printed in Sweden." In such tube filling line GA-2, the tube holders may be of a type described in my aforesaid U.S. Pats. No. 2,574,157 and No. 3,147,018.

As distinguished from such automatic tube filling line in which the tubes are dropped under the forece of gravity into the tube holders, the present invention is directed to a method and apparatus for injecting collapsible tubes by a positive action into the tube holders and feeding the tubes from a chute or hopper by an improved outlet channel to a novel tube carrier injection mechanism so arranged as to periodically position a tube supplied from the hopper into a holder in the tube filling line.

There has been also noted of interest U.S. Pat. No. 2,740,552, granted Apr. 3, 1956 to William E. Palmer, in which there has been disclosed a hopper for feeding frankfurters including a zig-zag passageway within the lower portion of the hopper for the purpose of maintaining the frankfurters in parallel horizontal alignment as they are being dispensed.

U.S. Pat. No. 2,696,327, granted Dec. 7, 1954 to Maurice D. Woodruff, discloses a hopper with an undulate or serpentine shaped wall structure which assists in maintaining dispensed lengths of wire in a parallel, horizontal position.

U.S. Pat. No. 1,622,686, granted Mar. 29, 1927 to B. P. Sutherland, discloses a potato feeder of a potato planter in the form of a rotary spider having jaws or clamps arranged around its periphery for the purpose of individually grasping the potatoes coming out of a hopper.

Blomquist U.S. Pat. No. 892,391, McGurk U.S. Pat. No. 3,315,842 and Jonas et al. U.S. Pat. No. 3,435,988 are all included as being of interest inasmuch as they teach hoppers for individual dispensing of articles, such that the lower portion of the hoppers are provided with flexible extensions for the purpose of retaining the articles for individual removal.

The prior art, however, does not teach or suggest the steps of the present method or the provision of means for effecting the positive injection or insertion of the tube into its effective operative position in the tube holder of the filling line without the attendant inaccuracies of the prior art gravity feed or mere dropping of the tube under the force of gravity into a tube holder, as heretofore.

Nor does the prior art suggest the improved output channel of the hopper of the present invention whereby the carton tubes may be sequentially deposited in a horizontal position on a receiver platform so as to assure the horizontal alignment thereof for selective individual removal by the tube carrier mechanism and subsequent injection by a positive action into the tube holders of the tube filling line.

Moreover, the zig-zag frankfurter feeding magazine of aforenoted U.S. Pat. No. 2,740,552, the serpentine wall structure of the wire feeder disclosed in said U.S. Pat. No. 2,696,327, and the rotary spider feeder arrangement of the potato planter of said U.S. Pat. No. 1,622,686 would appear to all relate to non-analogous arts and to distinctly different problems from that of the method and apparatus of the present invention, to wit: injecting by positive action collapsible carton tubes into holders of a tube filling line or machine.

SUMMARY OF THE INVENTION

The invention contemplates a method and apparatus for injecting by positive action empty collapsible carton tubes into tube holders of a machine for filling the tubes with a suitable dispensible material and, more particularly, the provision of a hopper or chute for sequentially supplying the tubes to a receiving platform and in a predetermined relation to a rotatable carrier mechanism having arms including jaws or fingers periodically operable to grasp the carton tube disposed on the receiving platform and to thereafter angularly position the grasped tube by positive action into a selected tube holder of the tube filling machine. Upon the tube being thereby injected into the tube holder, the jaws or fingers grasping the tube are thereupon actuated to an open position to release the injected tube then effectively inserted in the tube holder, while simultaneously jaws or fingers of a succeeding arm of the carrier mechanism are rendered effective to grasp a succeeding carton tube then positioned on the receiving platform, whereupon the positive injection action heretofore described is repeated.

While the subject matter of the present invention is especially useful in supplying tubes to a tube filling machine, and the ensuing description and drawings are directed to handling such tubes by way of example, the invention may also be advantageously employed in handling various other types of tubes, articles and objects.

A primary object of this invention is to provide an improved method and apparatus for readily and expeditiously injecting empty collapsible tubes or the like by positive action into tube holders of a tube filling machine.

Another object of the invention is to provide apparatus of the character stated that is completely automatic and does not require human handling or contact with the tubes during any stage of the tube filling operation, thereby avoiding any possibility of contamination of the tubes.

Another object of the present invention is to provide such a method for injecting in positive steps successive carton tubes disposed on a receiving platform by first grasping the tube and angularly positioning the tube into a selected tube holder of a tube filling line operably positioned in timed relation therewith, and, simultaneously with the release of the tube injected into the tube holder, effectively grasping a succeeding tube then positioned on the receiving platform, whereupon the positive injection action heretofore described is repeated.

Another object of the present invention is to provide in such automatic operation of an apparatus of the type stated, means for periodically injecting empty collapsible carton tubes by positive action into tube holders operably positioned in timed relation therewith so that the tubes received in the holders may be thereafter successively filled with a suitable dispensible material.

A further object of the invention is to provide a hopper or chute for supplying the tubes to the aforesaid receiving platform, in which there is provided an improved outlet channel having one series of projecting flanged portions arranged in spaced relation along one side of the channel, and another series of other projecting flange portions arranged in spaced relation along an opposite side surface of the channel, each of the flange portions projecting from the one side surface of the channel being positioned in an intermediate spaced relation to flange portions projecting from the opposite side surface of the channel so as to provide a series of relatively short angular paths for permitting a controlled restricted passage for each tube between flanges at opposite sides of the channel. The arrangement is such that a weighted end portion of the tube under force of gravity may initially pass through a restricted angular path defined by a first pair of said flanges and thereafter may be held back by a next succeeding flange, until the opposite end of the tube moves along the restricted angular path to a point where the entire tube passes through the gap defined by the preceding pair of projecting flanges and thereafter through similar short angular paths until ultimately each of the tubes is in turn disposed on a receiving platform in a substantially horizontal relation and not in a random, tilted or jamming position.

A further object of the invention is to provide a tube carrier injection mechanism operatively arranged in relation to the aforenoted receiving platform and including cam operated jaws or spring fingers carried by devices operably connected to arms of a rotatable spider and so arranged as to periodically and successively grasp a carton tube disposed on the receiving platform and thereafter to angularly position the grasped tube and inject the tube by positive action into a selected tube holder of the tube filling machine; while, upon the tube being thus injected into the tube holder, the cam operated jaws or spring fingers grasping the tube are thereafter actuated to an open position so as to release the injected tube then effectively inserted in the tube holder and the jaws or fingers carried by the device operably connected to the succeeding arm of the spider being then rendered effective to grasp a succeeding tube disposed on the receiving platform.

These and other objects, together with the advantages of the invention, are manifest from the following description in terms of the embodiment thereof which is shown in the accompanying drawings.

DESCRIPTION OF THE DRAWINGS

In the drawings, wherein like reference numerals indicate corresponding parts in the several views:

FIG. 1 is a front elevational view of a hopper and tube injection apparatus empbodying the present invention;

FIG. 2 is a sectional view taken along staggered line 2—2 of FIG. 1 and looking in the direction of the arrows so as to illustrate the cooperative arrangement of the hopper in relation to a rotatable spider mechanism having arms operably connected to devices carrying jaws or fingers periodically operable so as to successively grasp a carton tube disposed on a receiving platform by the hopper with the arm operably connected to the device carrying jaws or fingers grasping the carton tube being thereafter rotated, as indicated by the arrow, and the carton tube angularly positioned, as indicated by the dash-dot arrow line, so as to cause the carrier device to inject by a positive action the grasped carton tube into a tube holder in a tube filling line operably positioned in timed relation with the rotatable spider mechanism;

FIG. 3 is an enlarged fragmentary sectional view of the hopper of FIG. 1, partially broken away, and illustrating the improved channel structure with angular flange portions projecting from opposite side surfaces of the channel to assure that the carton tube in passing through short angular paths defined by the angular flange portions is disposed on the receiving platform in a substantially horizontal relation, as shown by FIG. 2;

FIG. 4 is an enlarged back elevational view of the tube injection apparatus of FIG. 1 with a portion of the tube filling line including tube holders carrying carton tubes injected therein passing to the right of the tube injection apparatus;

FIG. 11 is an enlarged exploded perspective fragmentary view of the carrier device of FIG. 10, showing the operating structure of the carrier device for one of the jaws or spring fingers of the rotatable spider mechanism.

DESCRIPTION OF THE PREFERRED EMBODIMENT

Figure 5:
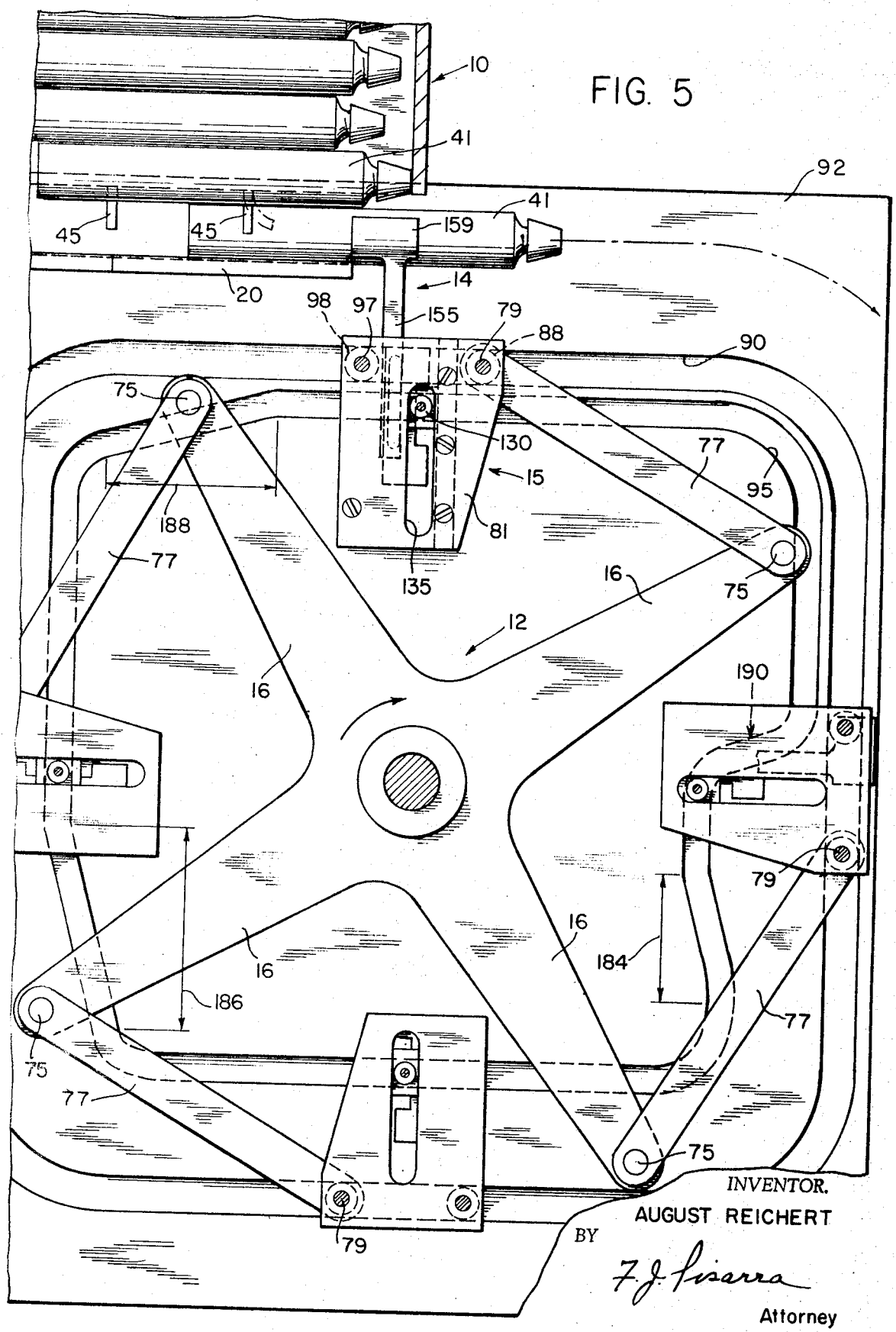
FIG. 5 is an enlarged sectional view taken along line 5—5 of FIG. 4 and looking in the direction of the arrows so as to illustrate a cam channel and channel track cooperatively arranged in relation to a carrier device for the respective jaws or spring fingers for grasping a carton tube, the carrier device being operably connected to an arm of the spider mechanism so as to effect the periodic grasping by the jaws or fingers of a carton tube disposed on the receiving platform and the subsequent releasing of the carton tube by the jaws or spring fingers upon completion of the injection thereof into a selected tube holder, as shown by FIG. 2.

Referring initially to FIGS. 1 and 2, the apparatus illustrated thereby includes an improved hopper 10 in combination with a tube carrier injection mechanism indicated generally by the numeral 11 having, as indicated somewhat more specifically by the numeral 12 of FIG. 2, a spider rotatably driven by a suitable motor 13.

The spider 12 includes suitable cam-operated jaws or spring fingers 14 of a carrier device 15 operably connected to arms 16 of the rotatable spider 12 and arranged to periodically and successively grasp a carton tube 18 disposed on a receiving platform 20 by the hopper 10, as hereinafter explained in greater detail.

The carton tube 18, thus grasped by the jaws 14 carried by the device 15 connected to the rotatable arm 16 of the spider 12, is in turn angularly positioned by the rotation of the spider 12 in the direction indicated by the full line arrow of FIG. 2 so that the carton tube 18, as indicated by the dash-dot arrow of FIG. 2, is injected by positive action into a selected tube holder 22 of a tube filling line 24 operably positioned in timed relation with the spider 12. The tube filling line 24 may include a plurality of such tube holders 22, each of which may have selectively inserted therein a carton tube 18, as indicated in FIG. 4.

The empty carton tubes 18 carried by the tube holders 22 of the tube filling line 24 thereafter pass through a machine of conventional type for filling the tubes with a suitable dispensible material of a wide range of viscosities. The tube holders 22 may be of a type described in my aforesaid U.S. Pats. No. 2,574,157 and U.S. Pat. No. 3,147,018, while the tube filling line may be of a type such as disclosed in the automatic tube filling line GA-2 shown in the afore-referenced bulletin identified as GAD-2-1069-E.

Moreover, upon the carton tube 18 being completely injected into the tube holder 22, the cam-operated jaws 14 grasping the tube 18 are thereafter actuated by suitable cam means to an open position so as to release the injected tube 18 then effectively inserted in the tube holder 22, as hereinafter explained.

IMPROVED HOPPER OR CHUTE

The empty carton tubes 18 have a substantially uniform diameter and are successively fed to the receiving platform 20, as shown by FIG. 2, through an improved hopper or chute 10 which may be supplied through its open upper end 26 with the empty carton tubes. This may be effected by a method and automatic apparatus for extracting the tubes from a transport receptacle and, in turn, feeding the extracted tubes to the open upper end of the hopper 10 along a platform 23, as disclosed in my said copending application Ser. No. 178,558.

The improvement in the hopper 10 over that of conventional structures resides, as shown by FIG. 3, in outlet channel structures 30 projecting downwardly from the open hopper end 26. A pair of such outlet channel structures are illustrated in FIG. 3.

Figure 8:
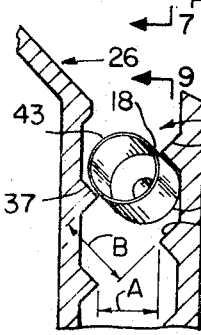
FIG. 8 is an enlarged fragmentary sectional view illustrating a carton tube heavier at one end, in its passage through the improved outlet channel of a hopper or chute embodying the present invention.
Figure 9:
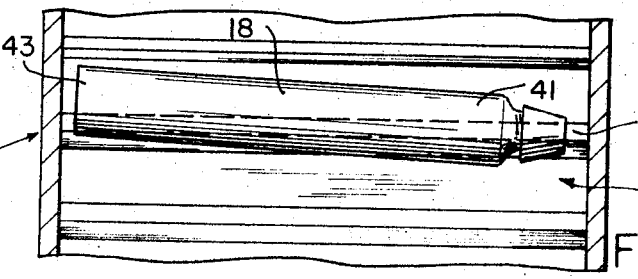
FIG. 9 is a fragmentary sectional view taken along line 9—9 of the improved channel structure of FIG. 8 and looking in the direction of the arrows.

The outlet channel structures 30 each includes an outlet channel 35 having a series of angular flange portions 37 projecting in spaced relation along one inner side surface of the channel 35, and another series of other angular flange portions 39 projecting in spaced relation along an opposite inner side surface of the channel 35 with each of the flange portions 37 projecting from the one inner side surface of the channel 35 being positioned in an intermediate and staggered spaced relation to the flange portions 39 projecting from the opposite inner side surface of the channel 35 so as to provide, as best shown in FIG. 3, a series of relatively short angular paths. These angular paths permit a controlled and restricted passage for each tube 18 between opposite angular face surfaces of the flange portions 37 and 39 projecting from opposite inner side surfaces of the channel 35 so that a weighted end portion 41 of the tube 18, under the force of gravity, initially passes through a restricted angular path defined by a first pair of the angular face surfaces of said flange portions 37 and 39 of the channel 35, as shown by the drawings of FIGS. 8 and 9. Thereafter the weighted end portion 41 is effectively held back by a next succeeding flange portion 39, until the opposite end portion 43 of the tube 18 of a relatively lighter weight moves under the force of gravity along the restricted angular path, as best shown by FIG. 8, to a point where the entire tube 18 passes through the gap defined by the opposite angular face surfaces of the preceding pair of projecting flange portions 37 and 39.

In the aforenoted arrangement, as best shown by FIG. 8, the angular flange portions 37 and 39 projecting from opposite inner side surfaces of the channel 35 have apices arranged in a limited spaced relation one to the other of a distance less than the diameter of the tube 18 so as to prevent passage of the tube 18 between the apices of the opposite angular flange portions 37 and 39 in a plane parallel to the oppoiste side surfaces of the channel 35, while opposite angular face surfaces of the flange portions 37 and 39 are arranged in a greater spaced relation one to the other of a distance greater than that of the diameter of the tube 18 so as to permit passage of the tube 18 therebetween in an angular path. Thus, dimension A, defined by the distance between the apices in said parallel plane of any pair of the flange portions 37 and 39 projecting from opposite inner side surfaces of the channel 35, is less than the diameter of the carton tube 18 so as to effectively restrict the passage of the tube 18 therethrough in a plane parallel to that of the opposite inner side surfaces of the channel 35. However, dimension B, defined by the distance between opposite angular face surfaces of the pair of flange portions 37 and 39 projecting from the opposite inner side surfaces of the channel 35, is greater than the diameter of the carton tube 18 so as to permit the carton tube 18 under the force of gravity to pass along a relatively short angular path of the greater width B defined by opposite angular face surfaces of the pair of flange portions 37 and 39, as shown by FIG. 8.

Figure 6:
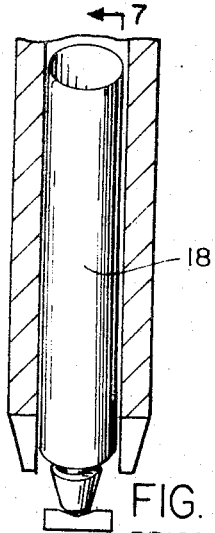
FIG. 6 is an enlarged sectional view illustrating one of several random positions that may be taken by a carton tube of a type heavier at one end, when passing under force of gravity through a conventional chute to a horizontal platform.
Figure 7:
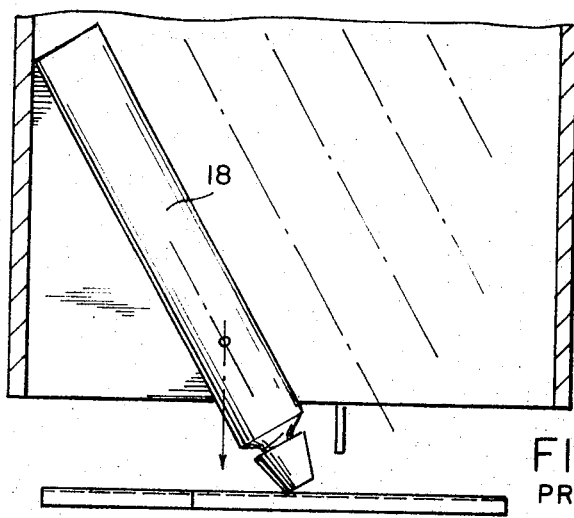
FIG. 7 is a sectional view taken along line 7—7 of FIG. 6 and looking in the direction of the arrows and illustrating a side view of the carton tube of FIG. 6.

In the conventional type chute or hopper, if it were possible to uniformly release the carton tube 18 horizontally so that under the force of gravity it might not contact the side, front or rear walls of the outlet channel of the hopper in its passage all the way down to the receiving platform, the problem illustrated by FIGS. 6 and 7 resulting from the weighted cap end portion of the carton tube 18 might not arise. In such problem, there is involved the initial inevitable uneven contact of the carton tubes above, at the point of release, and with the walls of the outlet channel of the conventional type chute or hopper causing turning moments about the center of mass of the carton tube. These moments occurring so as to cause the carton tube to turn with its weighted end portion or cap down, as shown by FIGS. 6 and 7.

In the improved outlet channel 35 of the present invention, the dimension A, as heretofore explained, is too narrow to permit the passage of the carton tube 18, while the dimension B of the short angular paths defined by the opposite angular face surfaces of the angular flange portions 37 and 39 projecting from the opposite surfaces of the channel 35 is such that upon one end portion of the carton tube 18 contacting an inner side surface of the outlet channel 35 or next succeeding flange portion, it is effectively held back until the other end, under the force of gravity, moves along the short angular path to a point where the entire carton tube passes through the gap of the short angular path of the dimension B, as shown by FIGS. 8 and 9, until the ultimate outlet of the channel 35 is reached, at which time the carton tube 18 is disposed in a substantially horizontal position onto the receiving platform 20 and not in the random tilted or jamming position of the conventional arrangement of FIGS. 6 and 7.

Flexible extensions 45 formed of a suitable rubber or resilient plastic material are arranged at the outlet of the channel 35 to the receiving platform 20, as shown by FIGS. 3 and 5, so that, as carton tubes 18 are successively fed through the improved outlet channel 35, the flexible extensions 45 serve to prevent the carton tubes 18 from falling out of either side of the receiving platform 20, while at the same time the flexible extensions 45 yield as the spring fingers 14 move into the aforedescribed position to grip the carton tube 18 and then move out with the carton tube 18 upon the angular movement of the spider 12, as shown by FIG. 5.

Moreover, it will be seen from FIG. 9 that the dimensions of the inner side surfaces of the outlet channel 35 are such as to be effectively greater than the length of the carton tube 18 so as to avoid longitudinal jamming of the carton tubes 18 in the outlet channel 35.

Further, as shown in detail by FIG. 3, there is mounted on a plate 50, extending between the channel structures 30, a small actuating motor 52 arranged to drive an arm 54. The arm 54 includes a pin 56 at the outer end thereof slidably mounted in a slot 58 of a second arm 60 projecting radially from a cylinder 62 carrying a fin 64 formed of a rubber or other suitable resilient plastic material. The cylinder 62 is pivotally mounted on a pin 66 so that, upon rotation of the arm 54 by the motor 52, the cylinder 62 is oscillated so as to angularly position the rubber fin 64 over an arcuate range as indicated by the arrow of FIG. 3. The oscillation of the rubber fin 64 in the open end 26 of the hopper 10 serves to prevent carton tubes 18 supplied thereto from jamming in the hopper 10. The carton tubes 18 are delivered to the open end 26 of the hopper 10 along the platform 23, as heretofore disclosed in my said pending application Ser. No. 178,558. Moreover, the oscillating rubber fin 64 is alternately angularly positioned toward an opening to one of the pair of outlet channels 35 and then toward an opening to the other of said pair of outlet channels 35 as may be readily seen from FIG. 3. Thus, the carton tubes 18 supplied to the open end 26 of the hopper 10 are directed to one of the outlet channels 35 and then to the other of the outlet channels 35 through the alternate oscillating movement of the rubber fin 64.

One of the outlet channels 35 has been heretofore described. Since the other of the pair of outlet channels 35 is of identical structure, no further description with reference thereto is deemed necesssary at this time.

The carton tubes 18 thus supplied to receiving platform 20 through the outlet channels 35 of the hopper 10 are disposed in a horizontal position preparatory to the operation of spider 12 of the tube carrier injection mechanism, as will be explained hereinafter.

TUBE CARRIER INJECTION MECHANISM

The tube carrier injection mechanism, as best shown in FIGS. 2 and 5, includes a rotatable spider 12 having arms 16 operably connected to the respective carrier devices 15 for the cam operated spring fingers 14. Each of the spider arms 16 is connected at its outer end by a pin 75 to an end of a link 77 having an opposite end connected by a pin 79 to the carrier device 15, as shown by FIGS. 2 and 5.

Carrier devices 15 are preferably identical and, therefore, only one of these devices will be described having reference to FIGS. 4, 5, 10 and 11. As shown by FIG. 4, each carrier device includes two sets of jaws or pairs of spring fingers 14 for grasping the carton tubes 18 disposed on the respective receiving platforms 20, shown by FIG. 3.

Since the operating means for the two sets of jaws 14 is identical, only one set of jaws will be explained with reference to FIG. 10 and only one of the jaws of FIG. 10 will be explained with reference to the drawing of FIG. 11.

Each carrier device 15 also includes an integral unit comprising a base plate 80 and end plates 81 fastened to the base plate 80, as shown by FIG. 4, by suitable screws 83 in the end plates 81 and engageable in tapped holes 84 in the end surface of the base plate 80, as shown by FIG. 11. While only one end plate 81 is illustrated in FIGS. 5, 10 and 11, the structure thereof is identical to the end plate 81 at the opposite end of the base plate, as indicated by the drawing of FIG. 4.

The end plate 81 in each case is operably connected to a spider arm 16 by a link 77 having an end connected by a pivot pin 79 received in a hole 86 formed in the end plate (FIGS. 5 and 11). The pivot pin 79 projects through the end plate 81 and there is mounted at the opposite side of the end plate 81 and at an end of the pivot pin 79 a roller 88 which is received in a channel track 90 formed in an inner surface of each of a pair of side walls 92 of the tube carrier injection mechanism 11. The side walls 92 are mounted at opposite sides of the tube carrier injection mechanism 11 and are secured at the upper ends of the side walls 92 by angle bars 93 welded thereto and to lower portions of the outlet channel structures 30 of the hopper 10, as shown by FIG. 1. The side walls 92 are of identical structure having channel tracks 90 and cam channels 95 provided therein and arranged in cooperative relation with suitable followers for operating elements of the carrier devices 15 for the jaws, as shown by FIG. 4, and explained hereinafter in greater detail.

There is further provided in the end plate 81, as shown in detail by FIG. 11, a pin 97 carrying a roller 98 at the outerside of the end plate 81 and so arranged as to be also positioned in the channel track 90 for cooperation with the roller 88 in controlling the position of the carrier device 15 for the gripping jaws, as the carrier device 15 is moved along the channel track 90 by rotation of the spider 12. In distinction, the cam channel 95 serves to position suitable cam followers to control the operative condition of the jaws or spring fingers 14 through operating mechanism provided in the carrier device 15, as will be hereinafter explained.

OPERATING MECHANISM

In effecting the operation of the jaws or spring fingers 14, there is provided, as best shown in FIG. 11, a slide bar 100 having a pair of recesses 102. There are received in each of the recesses 102 a pair of grip assemblies 106 for each of the jaws 14 of one pair of the two sets, as shown in FIGS. 4 and 10, respectively.

The slide bar 100 is further recessed at 110, as shown by FIG. 11, for receiving a key 112 secured to the slide bar 100 by a rivet 114. The key 112, as thus fastened to the slide bar 100, is in turn slidably engaged in a longitudinal slot 116 formed in the base plate 80, as illustrated in FIGS. 4, 10 and 11, so that the slide bar 100 may be slidably positioned in relation to the base plate 80.

Figure 10:
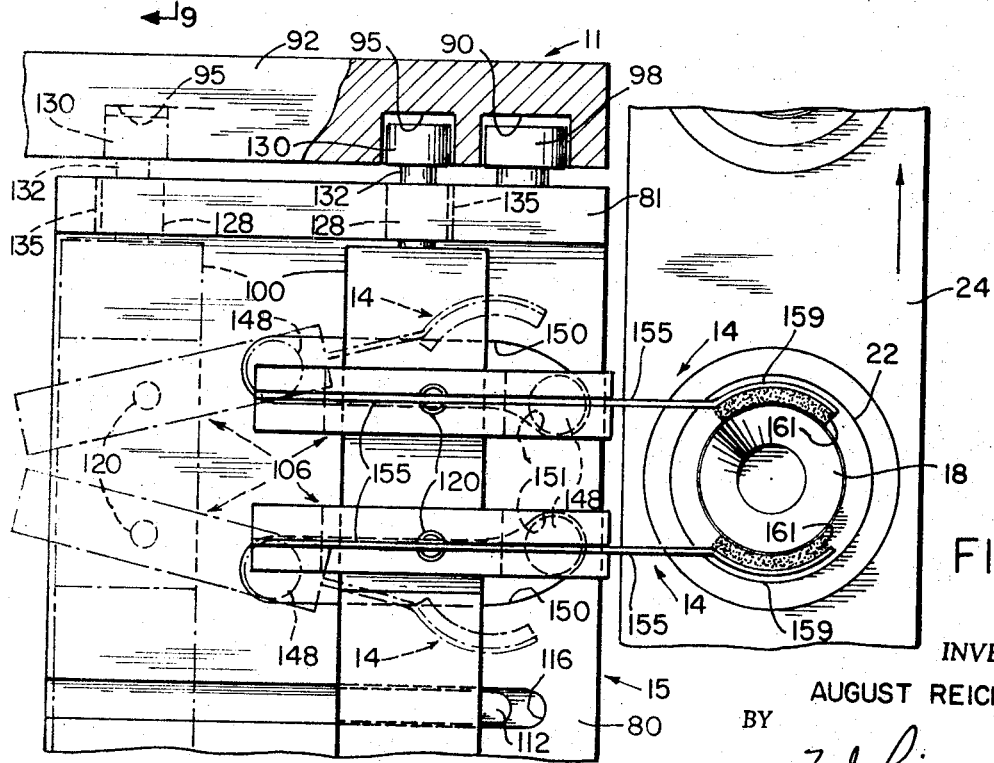
FIG. 10 is an enlarged fragmentary plan view of the carrier device for one pair of jaws or spring fingers during that part of the cycle of operation in which the carton tube is angularly positioned towards the tube holder and just prior to the jaws or spring fingers release point. The position of the parts on full retraction of the jaws or spring fingers after release immediately following injection of the carton tube into the tube holder is shown in dot-dash outline.

The slide bar 100 is further bored at 118 for receiving pivot pins 120, each of the pivot pins 120 being so arranged for pivotally mounting a grip assembly 106 for each of the jaws 14, as illustrated in FIG. 10, and one of which grip assemblies 106 is shown in detail in FIG. 11.

Further, as shown in FIG. 11, there are mounted at opposite ends of the slide bar 100 axially aligned pairs of rollers 128 and 130 spindled on corresponding shafts 132. The roller 128 is slidably mounted in a longitudinal slot 135 formed in the end plate 81, as illustrated in FIGS. 10 and 11, while the roller 130 is mounted in corresponding cam channels 95 formed in the inner surface of side walls 92 of the carrier injection mechanism 11, as shown by FIG. 4. Thus, as the carrier device 15 for the jaws 14 moves along the channel track 90, the roller 130 in following the surface of the cam channel 95 positions the slide bar 100 in relation to the end plate 81 and the roller 128 in the slot 135 to effect an opening and closing operation of the spring fingers or jaws 14.

In effecting the aforenoted operation of the jaws 14, it will be noted that the grip assembly 106 for each jaw or spring finger 14 includes a grip body 142, as shown by FIG. 11, which is bored at 140 and countersunk to 144 for receiving pivot pin 120 carried by the slide bar 100, as heretofore explained, and arranged for pivotally mounting the grip body 142 on the slide bar 100 and in the recessed portion 102 thereof, as shown by FIG. 11. Further, the grip body 142 has pivotally mounted on a pin 147 projecting from an end surface thereof a roller 148 arranged to be slidably engaged in a cam slot 150 formed in the base plate 80 and of a configuration, including an inwardly turned cam slot portion 151, such as to effect a desired closing operation of the jaws 14 upon the cam follower rollers 148 being positioned in the respective inwardly turned cam slot portions 151, as shown in FIG. 10.

Each jaw or spring finger 14 includes a leaf spring portion or arm 155, which is positioned in a longitudinal grip slot 157 formed in the grip body 142. Further, at the free end of the spring portion 155, there is provided a segmental arcuate portion 159 having mounted along a concave surface thereof, a resilient material 161 of a rubber or other suitable plastic for gripping the outer surface of the carton tube 18 when the jaws or spring fingers 14 are operably positioned to effect such a gripping operation.

In such assembly of the carrier device 15, the roller 128 is slidably engaged in the slot 135 with the roller 130 slidably engaged in the cam channel 95. Upon movement of carrier device 15 along channel track 90, the cam channel 95 may in turn position the roller 130 to initiate movement of the slide bar 100 and thereby roller 128 to an extreme position at one end of the slot 135 and the roller 148 in the inturned cam slot portion 151, as shown by the solid lines of FIG. 10, in which the jaws or spring fingers 14 are in a carton tube gripping position. Conversely the rollers 128 and 148 may be positioned in the slots 135 and 150, respectively, to opposite extreme positions therein so as to effect an open retracted position of the jaws 14 and with the slide bar 100 being positioned as indicated by the dash-dot lines of FIG. 10.

It has been found that under abnormal operating conditions there might be an obstruction at the delivery point of the carton tube 18 to the tube holder 22, which might cause a crushing of the tube 18 as the carrier device 15 approaches tube holder 22 as well as possible damage to the jaws 14. In order to prevent this, the leaf spring portion 155 of each of the jaws 14 is secured in the grip body 142 by a pair of detents or balls 163 and 165, respectively.

In such arrangement, the grip assembly body 142 is recessed at 170 and bored at 172 and 173 up to the grip slot 157. The detent balls 163 and 165, respectively, are held in the holes 172 and 173 and biased into detent holes 174 and 175 in the spring arm 155 by a flat leaf spring 178 locked in operative position by pins 180 received in securing holes 182 formed in the grip assembly 142. The balls 163 and 165 are partially received in the respective holes 174 and 175 so that upon an obstruction to the delivery of the carton tube 18 into the tube holder 22, the detent ball 163 (FIG. 11) will be forced out of the hole 174 to free or release the leaf spring portion or arm 155 of the jaw 14 for angular movement out of the slot 157 in the grip body 142 so as to prevent damage. The lower detent ball 165 partially received in the detent hole 175 may serve as a ball pivot about which the released spring arm 155 may be angularly positioned under the force applied to the jaw 14 by the impact of the carton tube 18 with such obstruction upon the carrier device 15 being driven by the spider 12.

Under extreme abnormal operating conditions, both the detent ball 163 and the detent ball 165 may be forced out of the respective detent holes 174 and 175 so as to fully release or free the spring arm 155 from the grip slot 157 of the grip body 142. Further, the detent balls 163 and 165 may be manually released from the respective detent holes 174 and 175 so as to permit the ready removal of the spring arm 155 from the grip slot 157 of the grip body 142.

Under normal operating conditions, the tube holders 22 are positioned by the tube filling line 24, as shown by FIG. 4, in timed relation with the rotation of the spider 12 so that periodically each of the tube holders 22 is selectively positioned into alignment with the carton tube 18 to be injected therein by the positive action of the gripping jaws 14 of the carrier device 15. However, under abnormal operating conditions, a misalignment of a tube holder 22 may cause an obstruction to the injection of the carton tube 18, whereupon the balls 163 may be forced out of the detent holes 174 to effect a release of the spring arms of the jaws 14 gripping the obstructed carton tube 18 from the respective grip assemblies 106 to prevent damage to the gripping jaws 14 and collapsible carton tube 18.

Referring to FIG. 5, it will be seen that the contour of the cam channel 95 is designed to position the cam channel follower roller 130 so as to actuate the jaws 14 in a closing sense in the three areas of transport of the carrier device 15 indicated by the numerals 184, 186 and 188. The sharp retraction at 190 in the cam channel 95 is required so as to position the jaws 14 into the fully retracted position shown by FIG. 10 so that the fingers 14 may be clear of the tube holder 22 in the movement of the spring finger carrier device 15 past the tube holder 22, as shown by FIG. 2.

The contour of the cam channel 95 at 184 and 186 effects a partial closing of the jaws 14 and is so provided in order to meet the geometry of the channel track 90 (instead of going straight to the turn), while the contour of the cam channel 95 at 188 serves to effect the positive closing of the jaws 14 about the carton tube 18 disposed in horizontal relation on the receiving platform 20 so as to thereby grasp the carton tube 18. Thereafter, movement of the carrier device 15 along the channel track 90 serves to angularly position the grasped tube 18 and inject the grasped tube 18 by positive action into a selected tube holder 22, as shown by FIGS. 2 and 10. The sharp retraction of the jaws 14 effected by the cam channel 95 at 190, as shown by FIGS. 2 and 10 by the dash-dot lines of the spring fingers 14, serves to release the grasped tube 18 and position the jaws 14 clear of the tube holder 22 of the tube filling line 24 after the effective injection of the carton tube 18 into the tube holder 22 by the aforesaid positive action.

Although only one embodiment of the invention has been illustrated and described, various changes in the form and relative arrangements of the parts which will now appear obvious to those skilled in the art may be made without departing from the scope of the invention. Reference is, therefore, to be had to the appended claims for a definition of the limits of the invention.

I claim:

1. For use with a machine of a type for filling with a dispensible material carton tubes carried by holders movably positioned in a predetermined relation, the combination comprising means for supplying in a sequential relation carton tubes one at a time to a selected location, a transfer assembly including gripping means, means periodically operable to render the gripping means effective in one sense to seize said one carton tube supplied to the selected location at said time, driving means to movably position said transfer assembly and thereby said gripping means so as to project the seized one carton tube selectively into one of said holders, said holders being movable in said predetermined relation so that the position of said transfer assembly and thereby the position of said gripping means may coincide with the relative position of a movable holder, said gripping means being rendered effective in another sense by said periodically operable means so as to release said seized carton tube upon the completion of the projection of said carton tube into said one of said holders, said transfer assembly including a spider having a plurality of radially projecting arms, said gripping means including carrier devices, each of the arms of the spider being drivingly connected to one of said carrier devices, each of said carrier devices including jaw means, end plates including means for rotatably supporting said spider, said periodically operable means including cam means carried by the end plates, control means for the jaw means carried by each of said carrier devices and arranged in cooperative relation with said cam means for selectively rendering the jaw means of each of said carrier devices effective in said one sense to seize said one carton tube and in said other sense to release said seized carton tube.

2. The combination defined by claim 1 in which the means for supplying the carton tubes includes a channel leading to an outlet, said channel having parallel extending opposite inner surfaces, a first series of angularly projecting flange portions arranged in spaced relation along one inner side surface of said channel, a second series of angularly projecting flange portions arranged in spaced relation along an opposite inner surface of said channel, the first and second series of angularly projecting flange portions having apices arranged in a spaced relation one to the other of a distance less than the diameter of said carton tubes so as to prevent passage of any of said carton tubes between the apices of the opposite angular flange portions in a plane parallel to the opposite inner surfaces of the channel, the first and second series of angularly projecting flange portions having opposite angular face surfaces arranged in a spaced relation one to the other of a distance greater than that of the diameter of the carton tubes so as to provide a series of relatively short angular paths for permitting successive passage of each of said carton tubes through said angular paths to the outlet of said channel, a receiving platform at said selected location, said receiving platform being positioned in a substantially horizontal spaced relation to the outlet of said channel so that said carton tubes may be sequentially disposed one at a time on said receiving platform in a substantially horizontal relation, flexible extensions arranged at opposite sides of the outlet of said channel and in cooperative relation with the receiving platform so as to prevent the one carton tube disposed on said receiving platform from being laterally displaced therefrom, the gripping means of the transfer assembly being rendered effective by said periodically operable means in said one sense to seize said one carton tube disposed on said receiving platform at said time, and said extensions being arranged to flex so as to permit the gripping means to be movably positioned by the driving means so as to rectilinearly displace the seized one carton tube off said receiving platform.

3. The combination defined by claim 1 in which the gripping means includes a plurality of carrier devices, means drivingly connecting the transfer assembly to each of said carrier devices, said carrier devices being operably arranged in a predetermined spaced relation about said transfer assembly, each of said carrier devices including end plates, a base plate extending between the end plates and secured thereto, a slide bar slidably positioned relative to the base plate, the slide bar including control means projecting through the end plates in an adjustable relation thereto for controlling the position of the slide bar in relation to the base plate; and the gripping means including jaw means, means for pivotally mounting the jaw means on the slide bar, cam means and cam follower means operatively connected between the base plate and the jaw means so as to control the operative position of the jaw means in relation to the base plate and the operative condition of the jaw means pivotally mounted on the slide bar by said pivotal mounting means dependent upon the position of the slide bar in relation to the base plate effected by the aforesaid control means, supporting for the carrier devices, said suporting means including means for rotatably supporting the transfer assembly, a track carried by said supporting means, the periodically operable means including controlling cam means carried by the supporting means, the end plates of the carrier device including track follower means projecting from the end plates of the carrier device and arranged in cooperative relation with said track, the control means projecting through the end plates of the carrier device being arranged in cooperative relation with the controlling cam means, the track of said supporting means being so arranged as to cause the track follower means to angularly position the carrier device in relation to the supporting means upon the carrier device being movably positioned in relation thereto, and the controlling cam means of said supporting means being so arranged as to cause the control means projecting through the end plates of the carrier device to control the operative position and condition of the jaw means in predetermined relation to the angular position of the carrier device to said supporting means so as to selectively render the jaw means of each of said carrier devices effective in said one sense and in said other sense, and upon said jaw means of one of said carrier devices being rendered effective in said one sense the track of said supporting means causes said one carrier device to position the seized carton tube rectilinearly from said selected location and then to position the one carrier device so as to angularly position the tube so as to project the seized one carton tube into said one selected holder upon said one carrier device being movably positioned along said track by said driving means.

4. The combination defined by claim 3 in which the end plates of each carrier device have a longitudinal slot therein and the control means projecting through the end plates of the carrier device include a pair of axially aligned rollers mounted at each end of the slide bar, one of said pair of rollers being slidably mounted in the longitudinal slot in the end plate adjacent thereto and in adjustable relation therein, and the other of said pair of rollers being cooperatively arranged in relation to said controlling cam means of said supporting means to control the position of said slide bar in relation to the base plate, the base plate including cam slots, and the jaw means including a pair of spring fingers, a grip assembly for carrying each spring finger, a pivot pin mounting the grip assembly for each spring finger on the slide bar to provide the pivotal mounting means for the jaw means, and each grip assembly including a cam follower projecting therefrom, the cam follower projecting from each grip assembly being arranged in cooperative relation in one of the corresponding cam slots of said base plate to provide the means operatively connecting the base plate to the jaw means, and each grip assembly including means for releasing the spring finger carried thereby to prevent damage to the spring finger upon an obstruction to the projection of the seized carton into one of said holders.

5. The combination defined by claim 4 in which the means for supplying carton tubes may provide carton tubes of substantially uniform diameter, and each of said carton tubes having one end portion of a greater weight than an opposite end portion thereof; and said combination including a channel leading from said supply means to an outlet of said channel; a receiving platform at said selected location, said receiving platform being positioned in a substantially horizontal spaced relation to the outlet of said channel, said channel including a first series of projecting flange portions arranged in spaced relation along one inner surface of the channel, a second series of projecting flange portions arranged in spaced relation along an opposite inner surface of the channel, the flange portions of said first and second series projecting in opposite relation, each of said projecting flange portions of said first series being positioned in an intermediate spaced relation to oppositely projecting flange portions of said second series so as to provide a series of oppositely extending restricted angular paths defined by pairs of said oppositely projecting flange portions, said angular paths permitting restricted successive passage of said carton tubes one at a time between projecting flange portions respectively of said first and second series, the first and second series of projecting flange portions being so arranged that the one end portion of said one carton tube under force of gravity may initially pass through a restricted angular path defined by a first pair of said oppositely projecting flange portions while further passage of said one end portion of the one carton tube may be restricted by an immediately succeeding oppositely projecting flange portion until the opposite end portion of the carton tube moves along the first mentioned restricted angular path under force of gravity to a point at which the entire one carton tube passes through the path defined by the first mentioned pair of oppositely projecting flange portions, the one carton tube thereafter passing in a similar manner through other of the series of oppositely extending restricted angular paths until the one carton tube ultimately passes to and through the outlet of said channel in such a manner that said carton tube may be effectively disposed on said receiving platform in a substantially horizontal relation.

6. The combination comprising a transfer assembly, the transfer assembly including gripping means, means periodically operable to render the gripping means effective in one sense to seize an object disposed at a first predetermined location, driving means to movably position said transfer assembly and thereby said gripping means, means for guiding travel of the gripping means about said transfer assembly and, upon said gripping means being rendered effective in said one sense, causing said gripping means to be positioned by said driving means so as to position the seized object rectilinearly from said first predetermined location and thereafter to project the seized object to another and second predetermined location, and said gripping means being rendered effective in another sense by said periodically operable means so as to release said seized object upon the completion of the projection of the object to said predetermined location, said transfer assembly including a spider having a plurality of radially projecting arms, the gripping means including carrier devices, each of the arms of the spider being drivingly connected to one of said carrier devices, each of said carrier devices including jaw means, end plates including means for rotatably supporting the spider, said periodically operable means including cam means carried by the end plates, control means for the jaw means carried by each of said carrier devices and arranged in cooperative relation with said cam means for selectively rendering the jaw means of each of said carrier devices effective in said one sense to seize said object an in said other sense to release said seized object.

7. A movable carrier device for controlling the position and operative condition of a means for gripping an object; said carrier device comprising end plates, a base plate extending between the end plates and secured thereto, a bar slidably positioned relative to the base plate, the slide bar including control means projecting through the end plates in an adjustable relation thereto for controlling the position of the slide bar in relation to the base plate; and the gripping means including jaw means, means for pivotally mounting the jaw means on the slide bar, cam means and other cam follower means operatively connected between the base plate and the jaw means so as to control the operative position of the jaw means in relation to the base plate, and the operative condition of the jaw means pivotally mounted on the slide bar by said pivotal mounting means being dependent upon the position of the slide bar in relation to the base plate effected by the aforesaid control means.

8. The combination defined by claim 7 including supporting means for the carrier device, the supporting means including a track, the end plates of the carrier device including track follower means projecting from the end plates of the carrier device and arranged in cooperative relation with said track, and the supporting means including controlling cam means, the control means projecting through the end plates of the carrier device being arranged in cooperative relation with the controlling cam means, the track of said supporting means being so arranged as to cause the track follower means to angularly position the carrier device in relation to the supporting means upon the carrier device being movably positioned in relation thereto, and the controlling cam means of said supporting means being so arranged as to cause the control means projecting through the end plates of the carrier device to control the operative position and condition of the jaw means in predetermined relation to the angular position of the carrier device to said supporting means.

9. The combination defined by claim 8 in which the end plates of the carrier device each have a longitudinal slot therein, and the control means projecting through the end plates of the carrier device includes a pair of axially aligned rollers mounted at each end of the slide bar, one of said pair of rollers being slidably mounted in the longitudinal slot in the end plate adjacent thereto and in adjustable relation therein, and the other of said pair of rollers being cooperatively arranged in relation to said controlling cam means of said supporting means to control the position of said slide bar in relation to the base plate, the base plate including cam slots, and the jaw means including a pair of spring fingers, a grip assembly for carrying each spring finger, a pivot pin mounting the grip assembly for each spring finger on the slide bar to provide the pivotal mounting means for the jaw means, and each grip assembly including a cam follower projecting therefrom, the cam follower projecting from each grip assembly being arranged in cooperative relation in one of the cam slots of said base plate corresponding thereto so as to provide the means operatively connecting the base plate to the jaw means, and each grip assembly including means for releasing the spring finger carried thereby to prevent damage to the spring finger upon an obstruction to the operation of the gripping means.

* * * * *